United States Patent
Ma et al.

(10) Patent No.: US 11,128,835 B2
(45) Date of Patent: Sep. 21, 2021

(54) DATA TRANSMISSION METHOD, CAMERA AND ELECTRONIC DEVICE

(71) Applicant: HANGZHOU HIKVISION DIGITAL TECHNOLOGY CO., LTD., Hangzhou (CN)

(72) Inventors: Qiang Ma, Hangzhou (CN); Xinyu Gu, Hangzhou (CN)

(73) Assignee: HANGZHOU HIKVISION DIGITAL TECHNOLOGY CO., LTD, Hangzhou (CN)

(*) Notice: Subject to any disclaimer, the term of this patent is extended or adjusted under 35 U.S.C. 154(b) by 0 days.

(21) Appl. No.: 16/757,171

(22) PCT Filed: Sep. 6, 2018

(86) PCT No.: PCT/CN2018/104342
§ 371 (c)(1),
(2) Date: Apr. 17, 2020

(87) PCT Pub. No.: WO2019/076156
PCT Pub. Date: Apr. 25, 2019

(65) Prior Publication Data
US 2020/0344444 A1 Oct. 29, 2020

(30) Foreign Application Priority Data
Oct. 20, 2017 (CN) .......................... 201710985838.4

(51) Int. Cl.
*H04N 7/08* (2006.01)
*H04N 5/765* (2006.01)
(Continued)

(52) U.S. Cl.
CPC ............... *H04N 7/08* (2013.01); *H04N 5/765* (2013.01); *H04N 7/025* (2013.01); *H04N 7/10* (2013.01); *H04N 7/183* (2013.01)

(58) Field of Classification Search
None
See application file for complete search history.

(56) References Cited

U.S. PATENT DOCUMENTS

| 7,168,084 B1* | 1/2007 | Hendricks | H04N 21/4344 |
| | | | 725/42 |
| 2011/0141235 A1* | 6/2011 | Tsukagoshi | H04N 13/183 |
| | | | 348/43 |

FOREIGN PATENT DOCUMENTS

| CN | 101127819 A | 2/2008 |
| CN | 103873806 A | 6/2014 |

(Continued)

OTHER PUBLICATIONS

International Search Report (English translation) and Written Opinion issued in corresponding PCT Application No. PCT/CN2018/104342, dated Nov. 14, 2018, 8 pages.

(Continued)

*Primary Examiner* — Christopher Braniff
(74) *Attorney, Agent, or Firm* — Meunier Carlin & Curfman LLC

(57) ABSTRACT

Method for transmitting data, camera, and electronic device. The method includes: obtaining an to-be-sent image and to-be-sent target data; determining a first position for the to-be-sent image in an effective image area of an image frame, and determining a second position for the target data in an effective image area of an image frame; taking the to-be-sent image and the target data as data of the same image frame, and sending the to-be-sent image according to the first position and the target data according to the second position in a data sending mode for the effective image area. Target data is data other than to-be-sent image and coaxial data, and coaxial data is notification information exchanged between a data receiving end and a data sending end. Target (Continued)

data and to-be-sent image can be sent to an electronic device through the same image frame without additional wiring. Facility costs are reduced.

13 Claims, 3 Drawing Sheets

(51) Int. Cl.
*H04N 7/025* (2006.01)
*H04N 7/10* (2006.01)
*H04N 7/18* (2006.01)

(56) References Cited

FOREIGN PATENT DOCUMENTS

| | | |
|---|---|---|
| CN | 105791752 A | 7/2016 |
| CN | 107241563 A | 10/2017 |
| EP | 2306746 A2 | 4/2011 |
| JP | 2015016918 A | 1/2015 |
| KR | 101698864 B1 | 1/2017 |

OTHER PUBLICATIONS

Extended European Search Report received in connection with European Application No. 18869102.6 dated Jul. 3, 2020, 10 pages.

* cited by examiner

DATA TRANSMISSION METHOD, CAMERA AND ELECTRONIC DEVICE

This is a national phase application filed under 35 U.S.C. § 371 of PCT International Application No. PCT/CN2018/104342, filed on Sep. 6, 2018, entitled "DATA TRANSMISSION METHOD, CAMERA AND ELECTRONIC DEVICE," which claims the priority to a Chinese patent application No. 2017/10985838.4, filed with the China National Intellectual Property Administration on Oct. 20, 2017, which are incorporated herein by reference in their entireties.

TECHNICAL FIELD

The present application relates to the technical field of signal transmission, and in particular to a method for transmitting data, a camera, and an electronic device.

BACKGROUND

In a surveillance system, an image capture device (such as a camera) may send captured images to an electronic device. The electronic device may receive and store the images sent by the image capture device, and then display a surveillance video. While sending an image, the image capture device may also send coaxial data together with the image to the electronic device. The coaxial data is notification information exchanged between devices during interaction. An image frame communicated between devices may be as shown in FIG. 1, including an effective image area and a blanking area. When sending an image frame, the image is usually used as data of the effective image area, and the coaxial data is used as data of the blanking area.

In relevant art, when transmitting the above image frame, transmission is usually performed between devices by using coaxial cables or twisted pair cables. If target data other than the image and the coaxial data needs to be transmitted, additional wiring is needed between the devices. However, this increases facility costs.

SUMMARY

The purpose of the embodiments of the present application is to provide a method for transmitting data, a camera, and an electronic device, so as to implement the transmission of target data without additional wiring. The specific technical solutions are as follows.

An embodiment of the present application provides a method for transmitting data. The method includes:

obtaining a to-be-sent image and obtaining to-be-sent target data, wherein the target data is data other than the to-be-sent image and coaxial data, and the coaxial data is notification information exchanged between a data receiving end and a data sending end;

determining a first position for the to-be-sent image in an effective image area of an image frame, and determining a second position for the target data in an effective image area of an image frame; and taking the to-be-sent image and the target data as data of the same image frame, and sending, in a data sending mode for an effective image area, the to-be-sent image according to the first position and the target data according to the second position.

Optionally, before sending the to-be-sent image and the target data, the method further includes:

obtaining to-be-sent coaxial data, and determining a third position for the coaxial data in a blanking area of an image frame; and taking the coaxial data as data of the image frame where the to-be-sent image and the target data are located, and sending the coaxial data according to the third position in a data sending mode for a blanking area.

Optionally, obtaining to-be-sent coaxial data comprises:

obtaining to-be-sent coaxial data that comprises data indicating the second position.

Optionally, a position for the data indicating the second position in the blanking area of the image frame is in front of the second position.

Optionally, the target data comprises a head identifier indicating a start position of the target data and an end identifier indicating an end position of the target data.

Optionally, obtaining to-be-sent target data comprises:

obtaining to-be-sent target data indicating environmental information of an environment in which an image capture device for the to-be-sent image is located; and/or obtaining to-be-sent target data indicating audio information captured by the image capture device for the to-be-sent image; and/or obtaining to-be-sent target data indicating image information of an image.

Optionally, when the target data is data indicating environmental information, the second position is a position rear to the first position;

when the target data is data indicating audio information, the second position is a position in front of the first position;

when the target data is data indicating image information, the second position is a position in front of the first position.

An embodiment of the present application provides another method for transmitting data, the method includes:

receiving an image frame;

determining a first position for an image in an effective image area of the image frame, and determining a second position for target data in the effective image area; wherein the target data is data other than the image and coaxial data, and the coaxial data is notification information exchanged between a data receiving end and a data sending end; and obtaining, in a data obtaining mode for an effective image area, the image from the image frame according to the first position and the target data from the image frame according to the second position.

Optionally, after receiving the image frame, the method further includes:

determining a third position for the coaxial data in a blanking area of the image frame; and obtaining the coaxial data from the image frame according to the third position in a data obtaining mode for a blanking area.

Optionally, the coaxial data is obtained before determining the second position for the target data in the effective image area.

Determining a second position for target data in the effective image area includes:

obtaining, from the coaxial data, data indicating the second position for the target data in the effective image area.

Optionally, determining a second position for target data in the effective image area includes:

determining, from the effective image area, a head identifier indicating a start position of the target data and an end identifier indicating an end position of the target data, and taking an area between and comprising positions indicated by the head identifier and the end identifier as the second position for the target data in the effective image area.

An embodiment of the present application provides a camera, including a processor, a communication interface, a memory, and a communication bus, wherein the processor, the communication interface and the memory communicate with each other through the communication bus.

The processor is configured for obtaining an to-be-sent image and obtaining to-be-sent target data; determining a first position of the to-be-sent image in an effective image area of an image frame, and determining a second position for the target data in an effective image area of an image frame; taking the to-be-sent image and the target data as data of the same image frame; and sending, in a data sending mode for an effective image area, the to-be-sent image according to the first position and the target data according to the second position; wherein the target data is data other than the to-be-sent image and coaxial data, and the coaxial data is notification information exchanged between a data receiving end and a data sending end.

The memory is configured for storing the to-be-sent image and the target data obtained by the processor.

Optionally, the processor is further configured for, before sending the to-be-sent image and the target data, obtaining to-be-sent coaxial data, and determining a third position for the coaxial data in a blanking area of an image frame; and taking the coaxial data as data of the image frame where the to-be-sent image and the target data are located, and sending the coaxial data according to the third position in a data sending mode for a blanking area.

Optionally, the processor obtaining coaxial data to be sent includes: obtaining to-be-sent coaxial data that comprises data indicating the second position.

Optionally, a position for the data indicating the second position in the blanking area of the image frame is in front of the second position.

Optionally, the target data includes a head identifier indicating a start position for the target data and an end identifier indicating an end position for the target data.

Optionally, the processor obtaining to-be-sent target data includes: obtaining to-be-sent target data indicating environmental information of an environment in which an image capture device for the to-be-sent image is located; and/or, obtaining to-be-sent target data indicating audio information captured by the image capture device for the to-be-sent image; and/or obtaining to-be-sent target data indicating image information of an image.

Optionally, when the target data is data indicating the environmental information, the second position is a position rear to the first position.

When the target data is data indicating the audio information, the second position is a position in front of the first position.

When the target data is data indicating the image information, the second position is a position in front of the first position.

An embodiment of the present application provides an electronic device, including a processor, a communication interface, a memory, and a communication bus, wherein the processor, the communication interface and the memory communicate with each other through the communication bus.

The processor is configured for receiving an image frame; determining a first position for an image in an effective image area of the image frame, and determining a second position for target data in the effective image area; obtaining, in a data obtaining mode for an effective image area, the image from the image frame according to the first position and the target data from the image frame according to the second position; wherein the target data is data other than the image and coaxial data, and the coaxial data is notification information exchanged between a data receiving end and a data sending end.

The memory is configured for storing the image and the target data obtained by the processor.

Optionally, the processor is further configured for after receiving the image frame, determining a third position for the coaxial data in a blanking area of the image frame, and obtaining the coaxial data from the image frame according to the third position in a data obtaining mode for a blanking area.

Optionally, the coaxial data is obtained before determining a second position for the target data in the effective image area; and determining a second position for target data in the effective image area comprises: obtaining, from the coaxial data, data indicating the second position for the target data in the effective image area.

Optionally, the processor determining a second position for target data in the effective image area includes: determining, from the effective image area, a head identifier indicating a start position of the target data and an end identifier indicating an end position of the target data, and taking an area between and comprising positions indicated by the head identifier and the end identifier as the second position for the target data in the effective image area.

An embodiment of the present application provides a computer readable storage medium having a computer program stored thereon which, when executed by a processor, causes the processor to perform the method for transmitting data according to the embodiment of the present application. The method for transmitting data includes:

obtaining a to-be-sent image and obtaining to-be-sent target data, wherein the target data is data other than the to-be-sent image and coaxial data, and the coaxial data is notification information exchanged between a data receiving end and a data sending end;

determining a first position for the to-be-sent image in an effective image area of an image frame, and determining a second position for the target data in an effective image area of an image frame; and taking the to-be-sent image and the target data as data of the same image frame, and sending, in a data sending mode for an effective image area, the to-be-sent image according to the first position and the target data according to the second position.

An embodiment of the present application provides a computer readable storage medium having a computer program stored thereon which, when executed by a processor, causes the processor to perform the method for transmitting data according to the embodiment of the present application. The method for transmitting data includes:

receiving an image frame;

determining a first position for an image in an effective image area of the image frame, and determining a second position for target data in the effective image area; wherein the target data is data other than the image and coaxial data, and the coaxial data is notification information exchanged between a data receiving end and a data sending end; and obtaining, in a data obtaining mode for an effective image area, the image from the image frame according to the first position and the target data from the image frame according to the second position.

Regarding the method for transmitting data and the camera according to the embodiments of the present embodiment, after obtaining the to-be-sent image and the target data, the first position for the to-be-sent image in the effective image area of the image frame and the second position for the target data in the effective image area are determined, and the to-be-sent image and the target data are taken as data of the same image frame, and the to-be-sent image is sent according to the first position, and the target data is sent according to the second position. The target data is data other than the to-be-sent image and coaxial data. Therefore, in the embodiments of the present application, the target data and the to-be-sent image can be sent to an electronic device through the same image frame without additional wiring, which can save facility costs.

BRIEF DESCRIPTION OF THE DRAWINGS

In order to more clearly describe the technical solution of the embodiments of the application or the prior art, drawings needed in the embodiments or the prior art will be briefly described below. Obviously, the drawings described below are for only some embodiments of the present application, one of ordinary skills in the art can also obtain other drawings based on these drawings without any creative efforts.

DETAILED DESCRIPTION

The technical solution of embodiments of the present application will be described clearly and completely below in combination with the drawings of the embodiments of the present application. Obviously, the embodiments described are only some of the embodiments of the present application instead of all of them. All other embodiments obtained by those of ordinary skill in the art based on the embodiments herein without any creative efforts are within the scope of the present application.

In the related art, images and coaxial data can only be transmitted between devices through transmission media such as coaxial cables or twisted pair cables. If data other than images and coaxial data needs to be transmitted, additional wiring is required.

In order to transmit target data without extra wirings, embodiments of the present application provide a method for transmitting data, a camera, and an electronic device. The present application will be described in detail below through specific embodiments.

Figure 1:
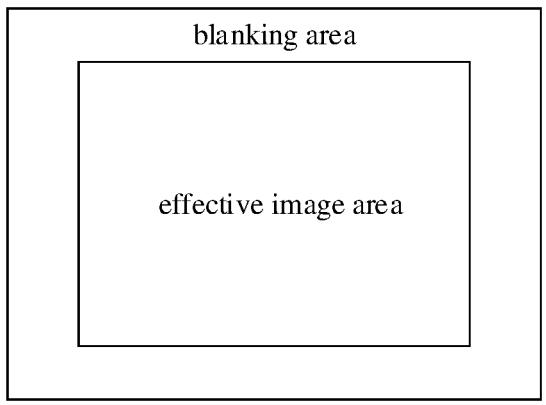
FIG. 1 is a schematic structural diagram of an image frame.
Figure 2:
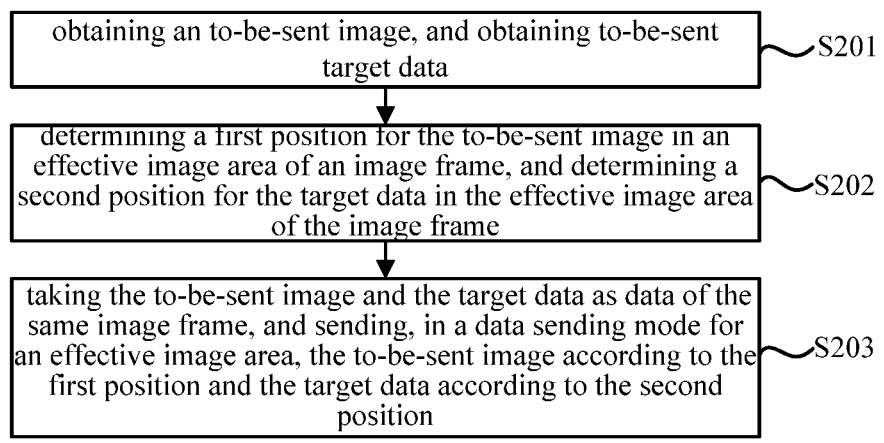
FIG. 2 is a schematic flowchart of a method for transmitting data according to an embodiment of the present application.

FIG. 2 is a schematic flowchart of a method for transmitting data according to an embodiment of the present application. This embodiment is applicable to a data sending end, and the data sending end may be a camera, a computer, a smart phone, or other devices with data processing capabilities. The method includes following steps S201-S203.

Step S201: obtaining an to-be-sent image, and obtaining to-be-sent target data.

The target data is data other than the to-be-sent image and the coaxial data. The coaxial data is notification information exchanged between a data receiving end and a data sending end, also referred to as PTZ data. When the data sending end and the data receiving end are respectively a video generating end and a video receiving end, the coaxial data exchanged between the video generating end and the video receiving end may include coaxial sending data sent by the video generating end to the video receiving end, and may also include coaxial receiving data sent by the video receiving end to the video generating end. For example, when the video generating end is a camera and the video receiving end is a digital video recorder (DVR), the coaxial data may include shooting mode information, information of readiness for upgrade sent by the camera to the DVR, etc., and may also include handshake data between the camera and the DVR, which may be used to send data that indicates device type and image resolution. The coaxial data may also include control information sent by the DVR to the camera, including control instructions for the camera, such as instructions for adjusting image parameters, instructions for adjusting the camera aperture, instructions for adjusting the rotation of the camera, instructions for switching the resolution, and instructions for remotely upgrading data. The coaxial data may also include information such as the position of the to-be-sent image in an image frame and the position of the target data in an image frame, or the like.

The image frame may or may not include the coaxial data.

In this step, the to-be-sent target data may be obtained in at least one of following manners.

In a first manner, to-be-sent target data that indicates environmental information of an environment in which an image capture device for the to-be-sent image is located can be obtained.

For example, the target data in this embodiment may include temperature information, humidity information, air pressure information, noise information, anion concentration, or the like. Accordingly, one or more of a temperature sensor, a humidity sensor, an air pressure sensor, a noise sensor, and an anion sensor may be integrated inside the image capture device.

Alternatively, the image capture device may be co-located with the above sensors instead of integrating the above sensors.

The image capture device may receive captured data sent by the sensors.

When the data sending end on which the method for transmitting data is executed is not an image capture device, the data sending end may obtain the target data captured by the sensors inside an image capture device, or the data sending end may directly obtain target data sent by the sensors.

When the data sending end on which the method for transmitting data is executed is an image capture device, the image capture device may directly obtain the target data sent by the sensors.

In a second manner, to-be-sent target data indicating audio information captured by an image capture device for the to-be-sent image is obtained.

The audio information captured by the image capture device may be audio information captured within a preset period of time. The preset period of time may be a continuous period of time or a plurality of discontinuous periods of time. The preset period of time may or may not include the moment when the target data is obtained. The duration of the preset period of time may be fixed or variable.

In a third manner, to-be-sent target data indicating image information of an image is obtained.

The above image may be the to-be-sent image, or an image obtained before or after the to-be-sent image is obtained. There may be one or more images. The image information may include a sub-image obtained from the image and conforming to a preset image feature, and may also include information for describing the sub-image. For example, the sub-image may represent a moving object in the image, or an obscured object in the image, or an abnormal condition in the image (for example, the image is overexposed, blurred, or color is distorted, etc.), or a special scene in the image (for example, objects beyond a predetermined limit, etc.). The objects may include a person, a vehicle, an animal, a building or the like. The information for describing the sub-image may be the number of the sub-image, the position of an sub-image, an image encoding format, a video encoding format, and private information, etc. The image encoding format may include jpg, bmp, etc., and the video encoding format may include H264, H265, etc. Private information may be understood as any information that is not publicly available, such as information on use rights of the image obtain device or the like.

In addition to the target data obtained in the above manners, to-be-sent target data obtained may include any data other than the to-be-sent image and the coaxial data. Embodiments are not limited in this aspect.

In this embodiment, the type of the target data may be an image type, a video type, or other types.

Step S202: determining a first position for the to-be-sent image in an effective image area of an image frame, and determining a second position for the target data in the effective image area of the image frame.

In this step, when determining a first position for the to-be-sent image in an effective image area of an image frame, the first preset position may be determined as the first position of the to-be-sent image in the effective image area of the image frame. The preset position includes a start position and an end position. The first position for the to-be-sent image in the effective image area of the image frame may also be determined according to the data volume of the to-be-sent image.

Determining the first position of the to-be-sent image in the effective image area of the image frame according to the data volume of the to-be-sent image may specifically include: determining the first position for the to-be-sent image in the effective image area of the image frame as a range from a first preset start position to a first end position. The first end position is a position obtained by adding the data volume of the to-be-sent image to the first preset initial position. Both the first preset initial position and the first end position are located in the effective image area.

In this step, when determining a second position of the target data in an effective image area, a second preset position may be determined as the second position of the target data in the effective image area. The second position for the target data in the effective image area may also be determined according to the data volume of the target data.

Determining the second position of the target data in the effective image area according to the data volume of the target data may specifically include: determining the second position of the target data in the effective image area as a range from a second preset start position to a second end position. The second end position is a position obtained by adding the data volume of the target data to the second preset initial position. Both the second preset initial position and the second end position are located in the effective image area.

The above second position may be a fixed position in the effective image area of the image frame, or may be a non-fixed position. When the position for the to-be-sent image in the effective image area is a fixed position, the second position for the target data in the effective image area may be a position other than the position of the to-be-sent image in the effective image area. For example, the second position may be at an area in the effective image area except the position for the to-be-sent image, or may occupy all areas in the effective image area except the position of the to-be-sent image. Embodiments are not limited in this aspect.

In order to be able to transmit simultaneously image data and target data in the effective image area, the resolution of an image frame transmitted between the data sending end and the data receiving end may be increased, and a low resolution may be transmitted with a high transmission rate. For example, a transmission parameter of 4MP30 may be utilized to transmit data that would otherwise be transmitted with a transmission parameter of 2MP30. The transmission parameter "xMPy" may be understood as transmitting data of y frames of x megapixel per second. When transmitting data with a transmission parameter of 4MP30, the number of rows in the effective image area are increased, and the data volume in each row is increased. Therefore, when image data is being transmitted, there are a larger amount of idle areas in the effective image area, which may be used to store target data.

When the second position is a fixed position, the data receiving end and the data sending end may negotiate on the second position in advance, so that the data receiving end may obtain the target data according to the negotiated second position. As such, the target data can be obtained with improved accuracy.

When the second position is a non-fixed position, the target data may include a head identifier indicating a start position of the target data and an end identifier indicating an end position of the target data. In this way, when obtaining the target data, the data receiving end may determine the start position of the target data according to the above head identifier, and determine the end position of the target data according to the above end identifier. The target data is obtained from the effective image area according to the determined start position and the end position of the target data, so that the target data can be accurately obtained when the second position is not fixed. In this implementation, target data can be sent with enhanced flexibility.

The head identifier may be a first preset bit string, and the end identifier may be a second preset bit string. A first preset number of bits from front of the target data may be the first preset bit string, and a second preset number of bits from rear of the target data may be the second preset bit string.

In an image frame, the data volume in an effective image area is much larger than that in a blanking area. Even if a part of the effective image area is allocated to the target data, the target data may have a large volume. For example, the data may be an image, a video, an audio, or the like.

Step S203: taking the to-be-sent image and the target data as data of the same image frame, and sending, in a data sending mode for an effective image area, the to-be-sent image according to the first position and the target data according to the second position.

In the present embodiment, the to-be-sent image and the target data are sent to a back-end electronic device through the same image frame. The image and the target data may be sent through the same cable.

The data sending mode may include data transmission in analog form or digital form. Data in the effective image area may be sent in analog form or digital form. Data in the blanking area may be sent in digital form.

In this step, the target data may be sent in digital form or analog form. In a specific implementation, the transmitted target data would be more accurate if sent in digital form. The to-be-sent image may be sent in analog form. This allows transmission of information in more abundance.

When the image frame is being sent, data in the image frame may be transmitted, for example, streamed in rows. Alternatively, data in the image frame may be streamed in columns.

When the data receiving end receives the image frame sent by the data sending end, the data receiving end may analyze the image frame according to a preset data storage rule to obtain the image and target data in the image frame.

It can be known from the above description, in the present embodiment, after obtaining the to-be-sent image and the target data, a first position of the to-be-sent image in an effective image area of an image frame and a second position of the target data in an effective image area are determined, and the to-be-sent image and the target data are taken as data of the same image frame, and the to-be-sent image is sent according to the first position, and the target data is sent according to the second position. The target data is data other than the to-be-sent image and coaxial data. Therefore, in the present embodiment, target data and a to-be-sent image can be sent to an electronic device through the same image frame without additional wiring. Facility costs are thus reduced.

In case where a large number of image frames are sent by the data sending end to the data receiving end, target data may be carried in all or a part of the image frames. When target data is obtained, an image frame in which the effective image area carries a to-be-sent image and the target data may be sent to the data receiving end. When target data is not obtained, an image frame in which the effective image area carries a to-be-sent image without target data may be sent to the data receiving end.

In another embodiment of the present application, as shown in FIG. 2, before sending the to-be-sent image and the target data, the method may further include following step1 to step2.

Step 1: obtaining to-be-sent coaxial data, and determining a third position for the coaxial data in a blanking area of an image frame.

In the present embodiment, the image frame includes the to-be-sent image, the target data and the coaxial data.

When determining the third position of the coaxial data in the blanking area of the image frame, the method may include: determining a third preset position in the blanking area of the image frame as the third position of the coaxial data. For example, a preset position from the second to fourth rows in the blanking area may be determined as the third position. In another implementation, the blanking area may further include a position for the coaxial data sent by the data receiving end to the data sending end. This position may be a position different from the third position in the blanking area.

The blanking area includes a vertical blanking area and a horizontal blanking area. The third position may be located in the vertical blanking area, or located in the horizontal blanking area. Alternatively, the third position may have a part located in the vertical blanking area and the other part in the horizontal blanking area. In a specific implementation, the vertical blanking area has a greater capacity for data storage than horizontal blanking area. Therefore, the third position may be determined from the vertical blanking area to allow a larger volume of coaxial data to be carried.

The step 1 may be performed before step S202, or may be performed after step S202. This is not specifically limited herein.

If the second position is not fixed, obtaining the to-be-sent coaxial data may include: obtaining to-be-sent coaxial data that includes data indicating the second position.

Since the third position of the coaxial data may be a fixed position, the data receiving end and the data sending end may negotiate on the third position in advance, so that the data receiving end may obtain the coaxial data from the negotiated third position. After the coaxial data is obtained, the second position may be determined according to the data indicating the second position included in the coaxial data. The target data is then obtained from the second position. Target data can thus be obtained with improved accuracy.

In the present embodiment, the coaxial data may further include data other than the data indicating the second position. This is not limited herein.

Step 2: taking the coaxial data as data of the image frame where the to-be-sent image and the target data are located, and sending the coaxial data according to the third position in a data sending mode for a blanking area.

Data in blanking area may be send in a mode of digital form. Therefore, in this embodiment, the coaxial data in the blanking area is sent in digital form according to the third position.

Figure 3A:
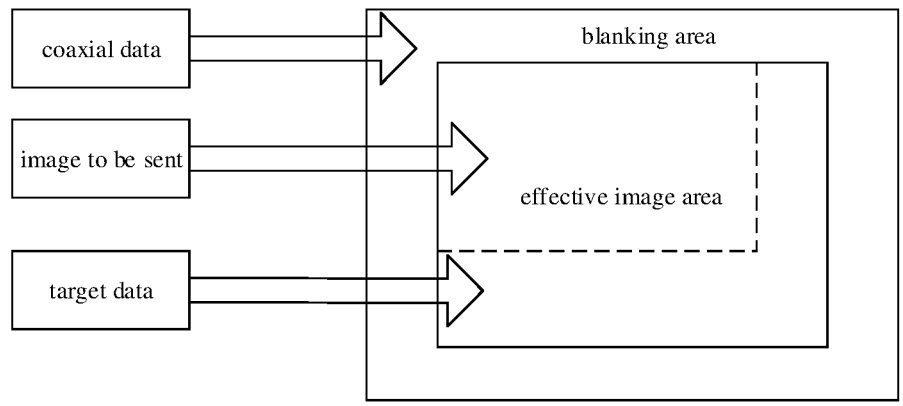
FIG. 3a is a schematic structural diagram of an image frame according to an embodiment of the present application.

As an example, FIG. 3a is a schematic diagram of data corresponding to an effective image area and a blanking area of an image frame. The solid rectangular frame in the middle defines the effective image area, which is divided by dashed lines into two parts. One is an area where the to-be-sent image is located, and the other is an area where the target data is located. The part outside the effective image area is the blanking area where the coaxial data is located.

Figure 3B:
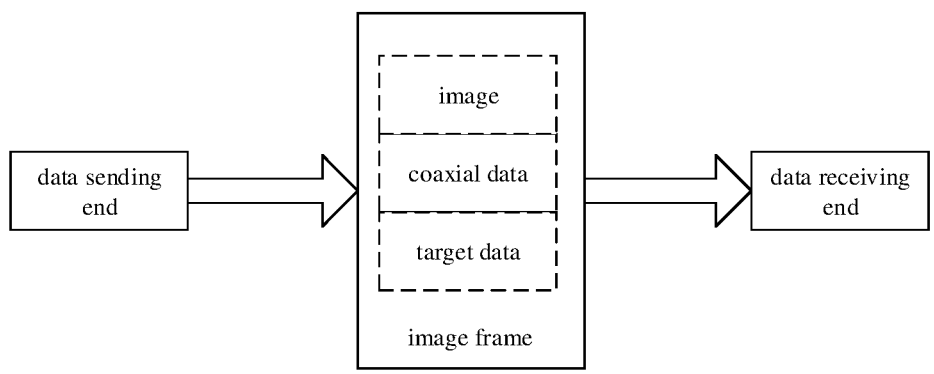
FIG. 3b is a schematic diagram illustrating a transmission framework for an image frame according to an embodiment of the present application.

As an example, FIG. 3b is a diagram illustrating architecture of transmission of an image frame from a data sending end to a data receiving end. The image frame includes an image, coaxial data and target data.

It can be seen that in the present embodiment, coaxial data is obtained, and sent together with the to-be-sent image and the target data to the data receiving end as data of the same image frame, so that the data receiving end receives the to-be-sent image, the target data, and the coaxial data through a single image frame. This improves the data transmission efficiency.

In a specific implementation of the above embodiment, the position for the data indicating the second position in the blanking area of the image frame is in front of the second position.

In the present embodiment, the third position may be in front of the second position. This may ensure that the position for the data indicating the second position in the blanking area of the image frame is in front of the second position.

For example, in FIG. 3a, the coaxial data may be located in a blanking area above the effective image area, so that the position for the data indicating the second position in the blanking area of the image frame is in front of the second position in the effective image area.

If the data receiving end obtains data in a front-to-back manner from received data carried by an image frame, the data receiving end can first obtain data indicating the second position in the coaxial data if the data indicating the second position in the blanking area of the image frame is positioned in front of the second position. Then the data receiving end obtains target data from the effective image area according to the data indicating the second position. This improves the efficiency of target data obtaining.

In another embodiment of the present application, as shown in FIG. 2, the target data may be data of multiple types, for example, data indicating environmental information, data indicating audio information, and data indicating image information. The second position may be preset according to relevance between types of data and images.

Specifically, when the target data is data indicating environmental information, the second position may be a position rear to the first position.

When the target data is data indicating audio information, the second position is a position in front of the first position.

When the target data is data indicating image information, the second position is a position in front of the first position.

In the present embodiment, data indicating audio information and data indicating image information are considered to be more relevant to the image and are thus data that can be obtained before the image. Such data may be in front of the first position in the effective image area. Data indicating environmental information is considered not so relevant to the image, and is thus data that can be obtained after the image. Such data may be rear to the first position in the effective image area.

In this way, when receiving data carried by an image frame, if the data receiving end obtains data in the front-to-back manner, it would first obtain data that can be obtained before the image, and then processes the data, such as determining a target image from the image according to the data, so as to display the target image as soon as possible for the user to view. The target image may be a head portrait of a stranger, an image of a suspicious vehicle, etc. Alternatively, the image may be processed according to this data, such as determining that there is an abnormality in a surveillance video and prompting the user to pay attention to the surveillance video, or enabling a recording function of the data receiving end, or the like.

The present application will be described in detail below with reference to specific examples.

The data sending end is a camera, and the data receiving end is a digital video recorder (DVR). The camera may obtain three types of data: image data, target data, and coaxial data. All three types of data obtained may be stored in a buffer in digital form. When the transmission period of an image frame arrives, corresponding data is obtained from the determined first position, second position, and third position of the buffer. The data sending end sends the obtained data row by row in data-stream form according to the data in the image frame. When the first position is reached, i.e. when an to-be-sent image is to be sent, image data in digital form is read from the buffer, converted into analog form, and sent to the DVR. When the second position is reached, i.e. when target data is to be sent, target data in digital form is read from the buffer, and sent to the DVR. When the third position is reached, i.e. when coaxial data is to be sent, coaxial data in digital form is read from the buffer, and sent to the DVR. The above first position, second position and third position in the same image frame may be arranged in various manners. Embodiments are not limited in this.

In relevant art, an to-be-sent image may be superimposed, in analog form, in an effective image area, and coaxial data may be superimposed, in digital form, in a blanking area Images with different resolutions have their own corresponding transmission parameter. An image with a high resolution may be transmitted with a higher transmission parameter. A transmission parameter may be represented by 2MP30, which means transmission of 30 image frames of 2 megapixel in per second. In the present embodiment, a higher transmission parameter may be used to transmit an image with a low resolution. For example, a transmission parameter of 4MP30 may be used to transmit an image frame that would otherwise be transmitted with a transmission parameter of 2MP30. In this way, there will be a lot of idle areas in the effective image area of the image frame. These idle areas may be used to transmit target data.

In the present embodiment, coaxial data is still transmitted in conventional ways, while to-be-sent image occupies, together with target data, the effective image area. The to-be-sent image may still be transmitted in analog form, and the target data may be transmitted in digital or analog form. The data sending end and the data receiving end may negotiate on the storage position of the target data in the image frame. Alternatively, the storage position of the target data in the image frame may be defined in the coaxial data. The data receiving end may easily obtain the storage position from the coaxial data by analysis.

In the method for transmitting data according to the present embodiment, target data is contained in each image frame. Therefore, better real-time performance and synchronization of data is allowed. Further, a large volume of data can be stored. The present embodiment is not limited in aspect of transmission medium. The transmission material may be coaxial cable, twisted pair cable, or any other medium. No additional wiring is required, and thus facility costs are reduced.

Scenarios in which the present application can be implemented will be described in detail below with reference to specific examples.

A company installs an analog camera with a motion detection function at the gate. When a moving object, such as a person or a vehicle, passes an area monitored by the camera, the camera generates corresponding information (i.e. target data). The information indicates presence of a moving object, and coordinates of the moving object in the image.

A specific flow is as follows. A built-in intelligent module of the camera will intelligently process images captured by the camera. When the intelligent module detects a face in an image of the scene, it will generate information about the number and positions of faces in the image. Further, the intelligent module of the camera may extract a sub-image according to the position information, so that an independent jpg picture is generated for each face. The camera uses the number of faces detected, the positions of the faces and the jpg pictures as data of the effective image area of a specified image frame. In addition, the effective image area of the specified image frame further includes an to-be-sent image. At the same time, the following description is added to the coaxial data: the current camera is an intelligent camera capable of face capture, the current target data includes face detection data, and the data in the effective image area of the current image frame includes the to-be-sent image and target data. After receiving the image frame, the DVR analyzes the coaxial data and determines that the current image frame carries target data and image data. The DVR then searches for and reads the target data in the effective image area and then stores these face images for subsequent users to check face data and determine a suspicious person, or the like.

Figure 4:
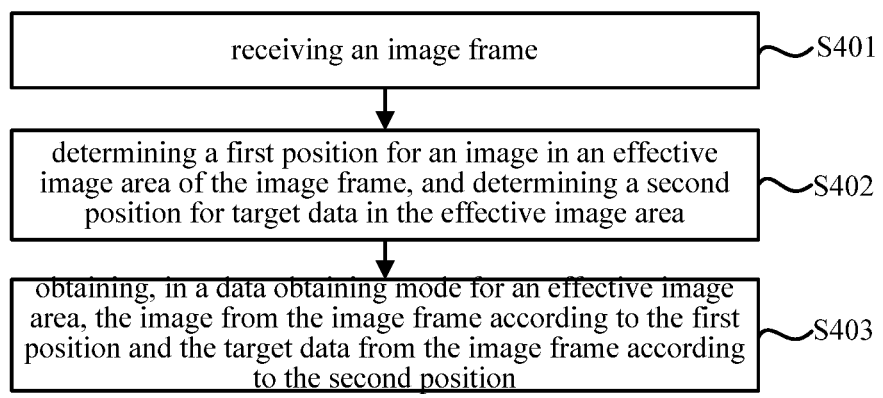
FIG. 4 is a schematic flowchart of another method for transmitting data according to an embodiment of the present application.

FIG. 4 is a schematic flowchart of another method for transmitting data according to an embodiment of the present application. This method is applicable to a data receiving end. The data receiving end may be a camera, a smart phone, or other electronic devices with data processing capabilities. The method includes following steps S401-S403.

Step S401: receiving an image frame.

Specifically, receiving an image frame may be understood as receiving an image frame sent by a data sending end. The image frame may be data received through a coaxial cable or a twisted pair cable.

Step S402: determining a first position for an image in an effective image area of the image frame, and determining a second position for target data in the effective image area.

The target data is data other than the image and coaxial data, and the coaxial data is notification information exchanged between the data receiving end and the data sending end.

The coaxial data may also be referred to as PTZ data. When the data sending end and the data receiving end are respectively a video generating end and a video receiving end, the coaxial data exchanged between the video generating end and the video receiving end may include coaxial sending data sent by the video generating end to the video receiving end, and may also include coaxial reception data sent by the video receiving end to the video generating end. The coaxial data may also include information such as the position for an to-be-sent image in the image frame and the position for the target data in the image frame, or the like.

The image frame may or may not include the coaxial data.

In this step, when determining the first position of the image in the effective image area of the image frame and determining the second position of the target data in the effective image area, the first position and/or the second position may be determined according to a position as negotiated. In this way, target data can be obtained with improved accuracy.

When the target data includes a head identifier indicating a start position of the target data and an end identifier indicating an end position of the target data, determining the second position for the target data in the effective image area may further include:

determining, from the effective image area, a head identifier indicating a start position of the target data and an end identifier indicating an end position of the target data, and taking an area between and comprising positions indicated by the head identifier and the end identifier as the second position for the target data in the effective image area. In this way, the position of the target data can be accurately determined, and target data can be sent with more flexibility.

The head identifier may be a first preset bit string, and the end identifier may be a second preset bit string. A first preset number of bits from front of the target data may be the first preset bit string, and a second preset number of bits from rear of the target data may be the second preset bit string.

Step S403: obtaining, in a data obtaining mode for an effective image area, the image from the image frame according to the first position and the target data from the image frame according to the second position.

In a data obtaining mode for the effective image area, data may be obtained in analog form or digital form. Data in a blanking area is obtained in digital form.

It can be seen that, in the present embodiment, after receiving an image frame, the first position for an image in the effective image area of the image frame and the second position of the target data in the effective image area may be determined, and the image is obtained according to the first position and the target data is obtained according to the second position in a data obtaining mode for the effective image area. Therefore, in the present embodiment, the target data and the image can be obtained from the same image frame without additional wiring. Facility costs can be saved.

In another embodiment of the present application, after the step S401 as shown in FIG. 4, i.e. after receiving the image frame, the method may further include following step1 to step2.

Step 1: determining a third position of the coaxial data in a blanking area of the image frame.

This step may specifically include: determining the third position of the coaxial data in the blanking area of the image frame according to a position as negotiated. The negotiated position may be a preset row in the blanking area, for example, the second to fourth rows in the blanking area.

The third position may be in front of or rear to the second position. The third position may be in front of or rear to the first position. A front position or a rear position may be understood as when an image frame is analyzed from top to bottom, a position near the top is a front position, and a position near the bottom is a rear position. For example, in FIG. 3a, when the data receiving end analyzes the image frame row by row from top to bottom, the upper row is at a front position in comparison with the lower row.

Step 2: obtaining the coaxial data from the image frame according to the third position in a data obtaining mode for the blanking area.

This step may specifically include: obtaining the coaxial data from the image frame according to the third position in a digital signal obtaining mode for the blanking area.

It can be seen that the image frame in the present embodiment includes coaxial data. After the image frame is received, the third position for the coaxial data in the blanking area of the image frame may be determined, and the coaxial data is obtained according to the third position from the image frame in a data obtaining mode for the blanking area. The image, target data and coaxial data can be received through the same image frame, which improves the data transmission efficiency.

In another implementation of the above embodiment, the coaxial data is obtained before the second position of the target data in the effective image area is determined. Step S402, i.e. determining a second position for target data in the effective image area may include:

obtaining data indicating the second position of the target data in the effective image area from the coaxial data.

In the present embodiment, the position of the target data in the effective image area may not be fixed. In this way, for each image frame, the second position of the target data may be obtained from the coaxial data, and then the target data is obtained according to the second position. Target data can be obtained with improved accuracy.

After obtaining the target data, the target data may be stored. In this way, the user may search for required data in the stored target data.

Figure 5:
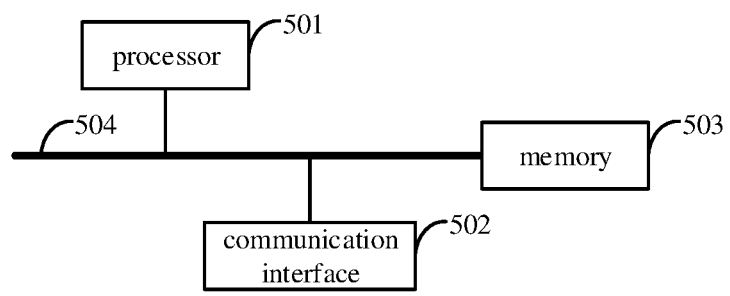
FIG. 5 is a schematic structural diagram of a camera according to an embodiment of the present application.

FIG. 5 is a schematic structural diagram of a camera according to an embodiment of the present application. This embodiment is corresponding to the method embodiment shown in FIG. 2. The camera includes: a processor 501, a communication interface 502, a memory 503, and a communication bus 504, wherein the processor 501, the communication interface 502 and the memory 503 communicate with each other through the communication bus 504.

The processor 501 is configured for obtaining an to-be-sent image and obtaining to-be-sent target data; determining a first position of the to-be-sent image in an effective image area of an image frame, and determining a second position for the target data in an effective image area of an image frame; taking the to-be-sent image and the target data as data of the same image frame; and sending, in a data sending mode for an effective image area, the to-be-sent image according to the first position and the target data according to the second position; wherein the target data is data other than the to-be-sent image and coaxial data, and the coaxial data is notification information exchanged between a data receiving end and a data sending end.

The memory 503 is configured for storing the to-be-sent image and the target data obtained by the processor 501. The memory may specifically be a buffer.

In another implementation of the present application, the processor 501 in the embodiment shown in FIG. 5 may specifically obtain to-be-sent coaxial data and determine a third position for the coaxial data in a blanking area of an image frame before sending the to-be-sent image and the target data, and then take the coaxial data as data of the image frame where the to-be-sent image and the target data are located, and sending the coaxial data according to the third position in a data sending mode for a blanking area.

In another implementation of the present application, in the embodiment shown in FIG. 5, the processor 501 obtaining the to-be-sent coaxial data includes: obtaining to-be-sent coaxial data that includes data indicating the second position.

In another implementation of the present application, in the embodiment shown in FIG. 5, the position of the data indicating the second position in the blanking area of the image frame is located before the second position.

In another implementation of the present application, in the embodiment shown in FIG. 5, the target data includes a head identifier indicating a start position of the target data and an end identifier indicating an end position of the target data.

In another implementation of the present application, in the embodiment shown in FIG. 5, the processor 501 obtaining to-be-sent target data indicating environmental information of an environment in which an image capture device for the to-be-sent image is located; and/or, obtaining to-be-sent target data indicating audio information captured by the image capture device for the to-be-sent image; and/or obtaining to-be-sent target data indicating image information of an image.

In another implementation of the present application, in the embodiment shown in FIG. 5, when the target data is data indicating environmental information, the second position is a position rear to the first position; when the target data is data indicating audio information, the second position is a position in front of the first position; when the target data is data indicating image information, the second position is a position in front of the first position.

Since the above camera embodiment is obtained based on the method embodiment and has the same technical effects as the method embodiment, the technical effects achieved by the camera embodiment are not described herein again. The camera embodiment is described briefly since it is substantially similar to the method embodiment, and the related parts can be referred to the corresponding description of the method embodiment shown in FIG. 2.

Figure 6:
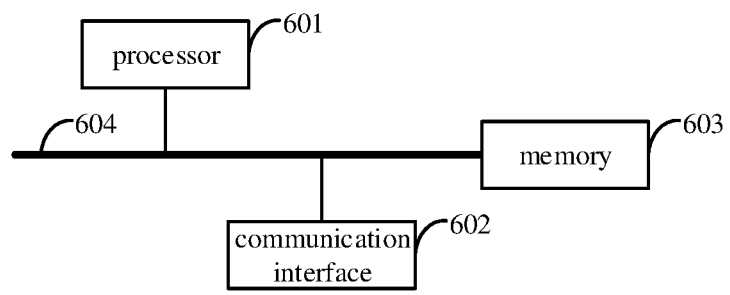
FIG. 6 is a schematic structural diagram of an electronic device according to an embodiment of the present application.

FIG. 6 is a schematic structural diagram of an electronic device according to an embodiment of the present application. This embodiment is corresponding to the method embodiment shown in FIG. 4. The electronic device includes: a processor 601, a communication interface 602, a memory 603, and a communication bus 604, wherein the processor 601, the communication interface 602 and the memory 603 communicate with each other through the communication bus 604.

The processor 601 is configured for receiving an image frame; determining a first position for an image in an effective image area of the image frame, and determining a second position for target data in the effective image area; obtaining, in a data obtaining mode for an effective image area, the image from the image frame according to the first position and the target data from the image frame according to the second position; wherein the target data is data other than the image and coaxial data, and the coaxial data is notification information exchanged between a data receiving end and a data sending end.

The memory 603 is configured for storing the image and the target data obtained by the processor 601.

In another implementation of the present application, the processor 601 in the embodiment shown in FIG. 6 may be specifically configured for determining a third position for the coaxial data in a blanking area of the image frame after receiving the image frame, and obtaining the coaxial data from the image frame according to the third position in a data obtaining mode for a blanking area.

In another implementation of the present application, in the embodiment shown in FIG. 6, the coaxial data is obtained before determining the second position of the target data in the effective image area; the processor 601 determining the second position for target data in the effective image area includes: obtaining, from the coaxial data, data indicating the second position for the target data in the effective image area.

In another implementation of the present application, in the embodiment shown in FIG. 6, the processor 601 determining the second position of the target data in the effective image area includes: determining, from the effective image area, a head identifier indicating a start position of the target data and an end identifier indicating an end position of the target data, and taking an area between and comprising positions indicated by the head identifier and the end identifier as the second position for the target data in the effective image area.

In the present embodiment, the electronic device may be a DVR device. The DVR device may specifically include a digital-analog (AD) conversion module, a main chip, a displayer, an interface, and a hard disk. The main chip may include a digital signal processing (DSP) encoding module, a DSP decoding module, and a CPU. The hard disk may be an ROM memory. The electronic device may perform live broadcast on image data in the received image frame.

Since the above electronic device embodiment is obtained based on the method embodiment and has the same technical effects as the method embodiment, the technical effects achieved by the electronic device embodiment are not described herein again. The electronic device embodiment is described briefly since it is substantially similar to the method embodiment, and the related parts can be referred to the corresponding description of the method embodiment shown in FIG. 4.

In the above camera embodiment and the electronic device embodiment, the communication bus may be a peripheral component interconnect (PCI) bus or an extended industry standard architecture (EISA) bus, or the like. The communication bus may include an address bus, a data bus, a control bus, or the like. For ease of representation, only one thick line is illustrated in the drawings. This, however, does not mean that there is only one bus or one type of bus.

The communication interface is used for communication between the above device and other devices.

The memory may include a random access memory (RAM), and may also include a non-volatile memory (NVM), such as at least one disk memory. Optionally, the memory may also be at least one storage device remote to the processor.

The above processor may be a general purpose processor, including a central processing unit (CPU), a network processor (NP), an advanced RISC machines processor etc.; it may also be a digital signal processing (DSP), an application specific integrated circuit (ASIC), a field-programmable gate array (FPGA) or other programmable logic devices, discrete gates or transistor logic devices, discrete hardware components.

An embodiment of the present application further provides a computer readable storage medium having a computer program stored thereon which, when executed by a processor, causes the processor to perform the method for transmitting data according to the embodiment of the present application. The method for transmitting data includes:

obtaining a to-be-sent image and obtaining to-be-sent target data, wherein the target data is data other than the to-be-sent image and coaxial data, and the coaxial data is notification information exchanged between a data receiving end and a data sending end;

determining a first position for the to-be-sent image in an effective image area of an image frame, and determining a second position for the target data in an effective image area of an image frame; and taking the to-be-sent image and the target data as data of the same image frame, and sending, in a data sending mode for an effective image area, the to-be-sent image according to the first position and the target data according to the second position.

It can be seen that, in the present embodiment, after obtaining the to-be-sent image and the target data, a first position for the to-be-sent image in the effective image area of the image frame and a second position for the target data in the effective image area are determined, and the to-be-sent image and the target data are taken as data of the same image frame, and the to-be-sent image is sent according to the first position, and the target data is sent according to the second position. The target data is data other than the to-be-sent image and coaxial data. Therefore, in the present embodiment, the target data and the to-be-sent image can be sent to an electronic device through the same image frame without additional wiring, which can save facility costs.

An embodiment of the present application further provides a computer readable storage medium having a computer program stored thereon which, when executed by a processor, causes the processor to perform the method for transmitting data according to the embodiment of the present application. The method for transmitting data includes:

receiving an image frame;

determining a first position for an image in an effective image area of the image frame, and determining a second position for target data in the effective image area; wherein the target data is data other than the image and coaxial data, and the coaxial data is notification information exchanged between a data receiving end and a data sending end; and obtaining, in a data obtaining mode for an effective image area, the image from the image frame according to the first position and the target data from the image frame according to the second position.

It can be seen that, in the present embodiment, after receiving an image frame, the first position for the image in the effective image area of the image frame and the second position for the target data in the effective image area may be determined, and the image is obtained according to the first position and the target data is obtained according to the second position in a data obtaining mode for the effective image area. Therefore, in the present embodiment, the target data and the image can be obtained from the same image frame without additional wiring, which can save facility costs.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "include", "comprise" or any other variants are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments.

The embodiments described above are only preferable embodiments of the present application, and are not intended to limit the protection scope of the present application. Any modifications, alternatives, improvements, or the like within the spirit and principle of the present application shall be included within the protection scope of the present application.

What is claimed is:

1. A method for transmitting data, comprising:

obtaining a to-be-sent image and obtaining to-be-sent target data, wherein the target data is data other than the to-be-sent image and coaxial data, and the coaxial data is notification information exchanged between a data receiving end and a data sending end;

determining a first position for the to-be-sent image in an effective image area of an image frame, and determining a second position for the target data in an effective image area of an image frame, wherein the effective image area comprises an area for the to-be-sent image and an area for the target data, and the coaxial data comprises data indicating the second position and is located in a blanking area of the image frame;

determining a third position for the coaxial data in a blanking area of an image frame, wherein the to-be-sent coaxial data comprises data indicating the second position; and taking the to-be-sent image and the target data as data of the same image frame, and sending, in a data sending mode for an effective image area, the to-be-sent image according to the first position and the target data according to the second position, to a receiving end, and taking the coaxial data as data of the image frame where the to-be-sent image and the target data are located, and sending the coaxial data according to the third position in a data sending mode for a blanking area to the receiving end; wherein, the data indicating the second position in the blanking area of the image frame is positioned in front of the second position, such that the data indicating the second position is received by the receiving end earlier than the target data.

2. The method of claim 1, wherein the target data comprises a head identifier indicating a start position for the target data and an end identifier indicating an end position for the target data.

3. The method of claim 1, wherein obtaining to-be-sent target data comprises:
  obtaining to-be-sent target data indicating environmental information of an environment in which an image capture device for the to-be-sent image is located; and/or
  obtaining to-be-sent target data indicating audio information captured by the image capture device for the to-be-sent image; and/or
  obtaining to-be-sent target data indicating image information of an image.

4. The method of claim 3, wherein when the target data is data indicating environmental information, the second position is a position rear to the first position;
  when the target data is data indicating audio information, the second position is a position in front of the first position;
  when the target data is data indicating image information, the second position is a position in front of the first position.

5. A non-transitory computer readable storage medium having a computer program stored thereon which, when executed by a processor, causes the processor to perform the method of claim 1.

6. A method for transmitting data, comprising:
  receiving an image frame;
  determining a first position for an image in an effective image area of the image frame, and determining a second position for target data in the effective image area; wherein the target data is data other than the image and coaxial data, and the coaxial data is notification information exchanged between a data receiving end and a data sending end, wherein the effective image area comprises an area for the to-be-sent image and an area for the target data, and the coaxial data comprises data indicating the second position and is located in a blanking area of the image frame;
  determining a third position for the coaxial data in a blanking area of the image frame; and
  obtaining, in a data obtaining mode for an effective image area, the image from the image frame according to the first position and the target data from the image frame according to the second position, obtaining the coaxial data from the image frame according to the third position in a data obtaining mode for a blanking area; and
  obtaining, from the coaxial data, data indicating the second position for the target data in the effective image area, and obtaining the target data from the effective image area according to the data indicating the second position.

7. The method of claim 6, wherein the coaxial data is obtained before determining a second position for the target data in the effective image area.

8. The method of claim 6, wherein determining a second position for target data in the effective image area comprises:
  determining, from the effective image area, a head identifier indicating a start position of the target data and an end identifier indicating an end position of the target data, and taking an area between and comprising positions indicated by the head identifier and the end identifier as the second position for the target data in the effective image area.

9. An electronic device, comprising a processor, a communication interface, a memory, and a communication bus, wherein the processor, the communication interface and the memory communicate with each other through the communication bus;
  the memory is configured for storing executable instructions; and
  the processor is configured for performing, when executing the instructions, the method for transmitting data of claim 6.

10. A non-transitory computer readable storage medium having a computer program stored thereon which, when executed by a processor, causes the processor to perform the method of claim 6.

11. A camera, comprising a processor, a communication interface, a memory, and a communication bus, wherein the processor, the communication interface and the memory communicate with each other through the communication bus;
  the processor is configured for obtaining an to-be-sent image and obtaining to-be-sent target data; determining a first position of the to-be-sent image in an effective image area of an image frame, and determining a second position for the target data in an effective image area of an image frame, wherein the effective image area comprises an area for the to-be-sent image and an area for the target data, and the coaxial data comprises data indicating the second position and is located in a blanking area of the image frame; determining a third position for the coaxial data in a blanking area of an image frame, wherein the to-be-sent coaxial data comprises data indicating the second position; taking the to-be-sent image and the target data as data of the same image frame; and sending, in a data sending mode for an effective image area, the to-be-sent image according to the first position and the target data according to the second position determining a third position for the coaxial data in a blanking area of an image frame, wherein the to-be-sent coaxial data comprises data indicating the second position; wherein the target data is data other than the to-be-sent image and coaxial data, and the coaxial data is notification information exchanged between a data receiving end and a data sending end;
  the memory is configured for storing the to-be-sent image and the target data obtained by the processor.

12. The camera of claim 11, wherein the target data comprises a head identifier indicating a start position for the target data and an end identifier indicating an end position for the target data.

13. The camera of claim 11, wherein processor obtaining to-be-sent target data comprises: obtaining to-be-sent target data indicating environmental information of an environment in which an image capture device for the to-be-sent image is located; and/or, obtaining to-be-sent target data indicating audio information captured by the image capture device for the to-be-sent image; and/or obtaining to-be-sent target data indicating image information of an image;

and wherein, when the target data is data indicating environmental information, the second position is a position rear to the first position;

when the target data is data indicating audio information, the second position is a position in front of the first position;

when the target data is data indicating image information, the second position is a position in front of the first position.

* * * * *